United States Patent [19]

Raman et al.

[11] Patent Number: 5,535,370
[45] Date of Patent: Jul. 9, 1996

[54] METHOD AND APPARATUS FOR REALISTIC CURRENT AND POWER CALCULATION USING SIMULATION WITH REALISTIC TEST VECTORS

[75] Inventors: Rajesh Raman, Fair Oaks; Chin S. Tan; Yung M. Chang, both of Folsom, all of Calif.

[73] Assignee: Intel Corporation, Santa Clara, Calif.

[21] Appl. No.: 173,773

[22] Filed: Dec. 22, 1993

[51] Int. Cl.⁶ .................................................... G06F 9/455
[52] U.S. Cl. ............................................. 395/500; 364/490
[58] Field of Search ..................................... 364/488, 489, 364/490, 491, 468, 578; 371/23; 395/500

[56] References Cited

U.S. PATENT DOCUMENTS

| | | | |
|---|---|---|---|
| 4,827,427 | 5/1989 | Hyduke | 364/489 |
| 5,278,770 | 1/1994 | Gore et al. | 364/490 |
| 5,313,398 | 5/1994 | Rohrer et al. | 364/468 |
| 5,349,542 | 9/1994 | Brasen et al. | 364/578 |
| 5,351,197 | 9/1994 | Upton et al. | 364/491 |
| 5,379,231 | 1/1995 | Pillage et al. | 364/488 |

*Primary Examiner*—Kevin J. Teska
*Assistant Examiner*—Dan Fiul
*Attorney, Agent, or Firm*—Blakely, Sokoloff, Taylor & Zafman

[57] ABSTRACT

An innovative method and system for calculating realistic current and power of a circuit prior to silicon utilizes simulation and test vectors to determine a number of variables to accurately perform current calculations close to actual silicon results. Input test vectors which preferably are similar in function to applications utilized with the circuit are used to drive a model of the circuit. The simulator operating the model maintains the toggle count for each device of the circuit. A characterization table is generated which contains an average switching current value of a type of a device for different values of capacitive loads. Typically, this table is generated once and is used for a multiplicity of calculations. An activity factor can then be generated based on the number of the toggle count during a sample time period and the number of clock cycles during the sample period. Using the activity factor, the current is determined from the average switching current for the device times the activity factor. The current can then be used to perform such calculations as power consumption and electromigration testing.

24 Claims, 7 Drawing Sheets

Sample Period T1, Clocks = 4

|  | Old A(i) | Toggle | New A(i) |
|---|---|---|---|
| Nand (c) | 0.5 | 1 | 1/4=0.25 |
| Latch (out) | 0.25 | 1 | 1/4=0.25 |

*Figure 4(c)*

Sample Period T2, Clocks = 2

|  | Old A(i) | Toggle | New A(i) |
|---|---|---|---|
| Nand | 0.5 | 2 | 2/2=1.0 |
| Latch | 0.25 | 2 | 2/2=1.0 |

*Figure 4(d)*

| Instruction | % of Ins.mix | # of Ins | Vector |
|---|---|---|---|
| Mov | 30% | 5304 | diag1,2 |
| ALU | 14.5% | 2564 | diag3 |
| JCC | 12.5% | 2210 | diag4 |
| PUSH/POP | 11.5% | 2034 | diag5 |
| CALL/RET. | 9% | 1596 | diag6,7,8 |
| CMP | 8% | 1414 | diag9 |
| SHR&ROT | 5.5% | 972 | diag10 |
| FP | 2% | 356 | |
| IO | 2% | 354 | |
| Total | 95% | 16800 | |

*Figure 5*

| Device | AF$_{P.A.}$ | AF$_{NEW}$ | I$_{P.A.}\mu A$ | I$_{NEW}\mu A$ |
|--------|-------------|------------|-----------------|----------------|
| A | 0.5 | 0.39 | 6.00 | 4.68 |
| B | 0.5 | 0.44 | 11.28 | 9.93 |
| C | 0.5 | 0.043 | 5.24 | 0.46 |

| $I_{P.A.}$ | $I_{NEW}$ | $I_{SILICON}$ |
|---|---|---|
| 270 µA | 45.3 µA | 39.4 µA |

*Figure 7*

METHOD AND APPARATUS FOR REALISTIC CURRENT AND POWER CALCULATION USING SIMULATION WITH REALISTIC TEST VECTORS

BACKGROUND OF THE INVENTION

1. Field of the Invention

The present invention relates to the determination of current and power consumption by circuit. More particularly, the present invention relates to a method for realistic current and power analysis.

2. Art Background

Although current and power consumption analysis of a circuit has been performed in the past, only recently, with the increasing focus on circuit design for portable computing devices, has the need for accurate calculation of current and power consumption early in the design process of the circuit become increasingly important. In addition, greater chip densities, more stringent design rules and higher operating frequencies call for stricter, more realistic power analysis and power bus design early in the design cycle, prior to fabrication on silicon.

Evaluation of power and power saving features can be performed once the circuit has been fabricated, i.e., after first silicon. This has obvious drawbacks such as redesigning the circuit late in the design cycle and hence, increasing the period of time from initial design to market. Moreover, even after first silicon, only the total current/power consumed by the chip as a whole can be obtained. The estimation of current/power consumed by each module/unit inside the chip during various debugging phases is still very difficult to obtain and typically inaccurate.

In the past, device counts of a circuit were used to estimate power. The number of each type of device and the typical power/current consumption by a device type were then used to generate a rough estimate of the current and power consumed.

SUMMARY OF THE INVENTION

It is therefore an object of the present invention to provide a method and apparatus for realistic power and current analysis.

It is further an object of the present invention to provide a system which uses the simulation of circuits to provide realistic current and power analysis on a device and circuit level.

In the system and method of the present invention, an actual toggle count, that is, the number of transitions from a low state to a high state and/or from a high state to a low state, is determined for each node in the circuit during simulation of the circuit. Using input vectors representative of applications to be applied to the circuit, a toggle count for a sample period can be generated which provides an accurate representation of the activity of each node in the circuit. The toggle count is divided by the total number of dock cycles during the simulation sample period to provide a more precise and accurate activity factor. In addition, for each node, the driver which drives the signal at that node is determined. Once the driver is identified, the strength or size of the driver, in terms of the capacitive load it drives, is determined.

Prior to simulation of the circuit, it is preferred that an average current for each device is determined for various devices in the circuit at various capacitive loads. Using a table generated therefrom as a reference, the current at the device is determined based on the capacitive load it drives and type of device. Therefore, a more accurate current measurement at each node (i) is determined according to the following equation:

$$\text{Current }(i) = Iavg(i) \cdot A(i)$$

where Iavg(i) represents the average current provided by the driver and A(i) represents the activity factor for the device which is equal to toggle(count)/total number of clock cycles.

Power can therefore be obtained as a product of the current multiplied by the operating voltage of the circuit. Furthermore, the total current of the circuit can be determined as:

$$\sum_{i=1}^{n} Iavg(i) \times A(i)$$

where n is the total number of nodes of the circuit.

Using this new methodology, realistic current and power calculations are provided. Other calculations such as electromigration, average current analysis and pre-silicon power estimations can be performed using this system. This capability enables designers and manufacturers to achieve the desired power and current consumption requirements during the early stages of the design process thereby enabling the product to get more quickly to market. Furthermore, the method described herein is readily applied to automation and requires little user input unlike prior methods which require input regarding device types and activity factors.

BRIEF DESCRIPTION OF THE DRAWINGS

The objects, features and advantages of the present invention will be apparent from the following detailed description in which:

FIG. 4b is a sample input of two time periods for the circuit of FIG. 4a.

FIG. 4c compares activity factors determined according to a prior art method and the method of the present invention for the first time period.

FIG. 4d illustrates the calculation of activity factors for the second time period using a prior art method and the method of the present invention.

FIG. 5 is a table providing exemplary vectors utilized to test a circuit in accordance with the teachings of the present invention.

FIG. 7 is a table comparing the computation of activity factors and current for the adder circuit of FIG. 6 using a prior art method and the method of the present invention.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention unnecessarily.

Figure 1:
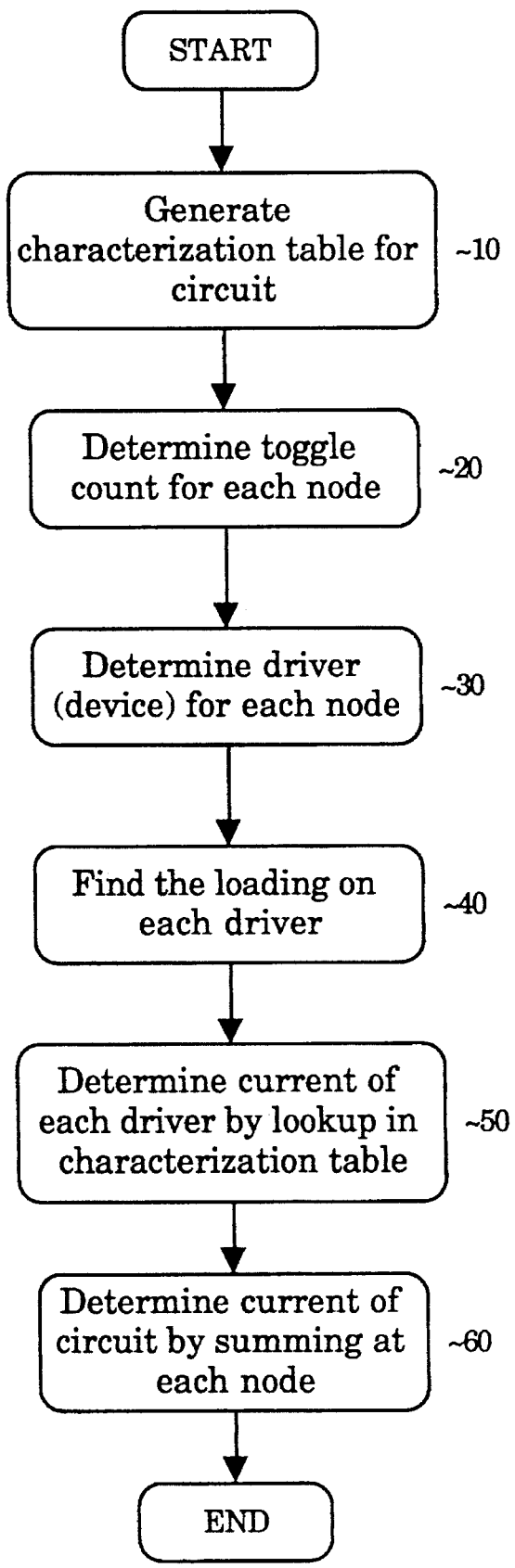
FIG. 1 is a flow diagram illustrating in general the method of the present invention.

A general flow diagram for the method for determining current and power is illustrated in FIG. 1. At step 10, a characterization table of average current values ($I_{cell}$ table) is determined for the circuit. This table can be generated once for a particular circuit or family of circuits and used as a reference over and over for multiple calculations. Preferably, using an accurate circuit simulator, a table of average current values for each type cell or type of device and capacitive load of the cell or device is generated. Preferably, these calculations are performed at a given frequency, voltage and temperature. More particularly, the table contains average current values for standard cells and special circuit cells that are contained in the circuit to be tested. A cell may be defined to include one or more devices. The current consumption values are generated for different sizes or strengths of each device and for different values of capacitive loading of the inputs. For example, for a particular device, the aver age current value is determined for capacitive values of 20%, 40%, 50%, 80% and a 100% of the maximum capacitive load of the cell. This table can be generated based on information output by a circuit simulators, such as a simulator using tools which allow a user to set and control simulation parameters in the specified circuit simulation and analyze the results of the simulation. An example of such a simulator is HSPICE, manufactured by Cadence, Inc.

Preferably, the average current of a cell, $I_{avg}$(cell), is determined during circuit simulation. In addition, it is preferred that the average current determined includes both the switching current and the charging and discharging of the capacitances of the load of the cell. In contrast, prior art methods consider only the charging and discharging of capacitance and do not take into account the switching current. The switching current is generated by the current conducting directly from VCC to VSS when the input swings between logic states. In many situations, this current may contribute significantly to the total current. The new device current calculation and the difference between the new method and a prior art method is shown below:

| New Method | Prior Art Method |
|---|---|
| $\dfrac{\int_0^T I(t)dt}{\int_0^T dt}$ | $\dfrac{V \times C}{\int_0^T dt}$ | where C is the maximum capacitance of the device, V is the voltage in the circuit, T is the amount of the time of the sample, and I(t) is the switching current needed to switch the state of the device.

To determine the activity factor, logic simulation of the circuit is used to generate a toggle count at each node in the circuit. That is, each time a node changes state, the toggle count for that node is incremented. To operate the logic simulator, test vectors are used as input. Preferably, the test vectors are selected with the end application in mind in order to provide an accurate toggle count and an indication of the activity of a node for that application. The toggle count is used along with the vector clock information to derive the activity factors. Preferably, a logic simulator engine is used, such as XPLUS™, a comprehensive package of software tools that run logic and fault circuit simulations on the XP line of simulation accelerators and is manufactured by Zycad Corporation.

At step 30, the driver or drivers for each node are determined. Preferably, the drivers are determined from the circuit model, for example, a circuit modeled in the EDIF2 format, a hierarchical net list description language (EDIF2 is the Electronic Design Interchange Format version 2.0.0, Recommend Standard EIA-548, available from the Electronic Industries Association, Engineering Department, 2001 Pennsylvania Avenue, N.W. Washington, D.C. 20006). An EDIF2 circuit model can be generated using a software tool or package with circuit modeling/simulation capability that supports the EDIF2 net list description language. An example of such a tool is the XPLUS™ software, available from System Science, Inc. Therefore using the hierarchical net list of the circuit model, the driver or drivers of each node are determined.

At step 40, the loading at each node is then determined. As is known in the art, the loading of a node is determined by such factors as the fan out of signals from the node and the placement and routing of the signals. The capacitive loading on a node can be traced using a variety of methods or tools which can identify the capacitive loading at a node identified by a node name. The loading can be selected to be pre-layout or post-layout capacitances. At step 50, based upon the type of driver device and preferable size or strength of the driver device and the capacitive loading on the node, a lookup is performed in the characterization table ($I_{cell}$ table). This provides an average current value for each driving device for a particular mode. At step 60, the total average current for the circuit or a unit of the circuit can be determined using the following equation:

$$\dfrac{\sum\limits_{i=1}^{total} Iavg(\text{cell}(i)) \times \text{toggle}(i)}{\text{TotalClockCount}}$$

or $$\sum\limits_{i=1}^{total} Iavg(\text{cell}(i)) \times \text{activityfactor}(i)$$

where Iavg(cell(i)) represents the average current for the device, toggle(i) represents toggle count for the node driven by the device, and Total Clock Count represents the clock count for the sample period utilized.

It should be realized that a node may be driven by more than one device. A bus is a common example. A number of different alternatives may be used to provide accurate current and power for a node driven by multiple devices. For example, an average value of the current values determined with respect to each driver for particular node can be utilized in the calculation. Alternately, another approach would be to consider the worst case driver of the drivers identified for a particular node and use the worst case calculation as the current value for the node.

Sometimes, the load values for a particular device are not found when a lookup is performed in the characterization table. If an exact match for the load is not found, a linear approximation or similar approximating process may be performed to obtain the average current value of a cell from the load values and corresponding current values found in the table.

Preferably, the characterization table has values not only for standard cells but for special circuits that are found in the subject circuit being tested. This provides flexibility and more accurate current analysis. However, any cell, standard or non-standard described in a model, is built using a standard set of primitives (devices) and can be quantified according to the primitives. Also, the cell and the primitives which compose a cell have associated strengths (i.e., a maximum capacitive load a cell or primitive can drive) for modeling purposes. Using the information regarding the primitives which build a non-standard cell and their associated strengths, a mapping of the non-standard cell to the an equivalent standard cell can be performed. Once mapped, the current for a non-standard cell can be obtained from its equivalent standard cell value in the table. Although it is preferred that each special circuit have its own entry in the characterization table, a mapping of the primitives which compose the special circuit can alternatively be used.

Figure 2:
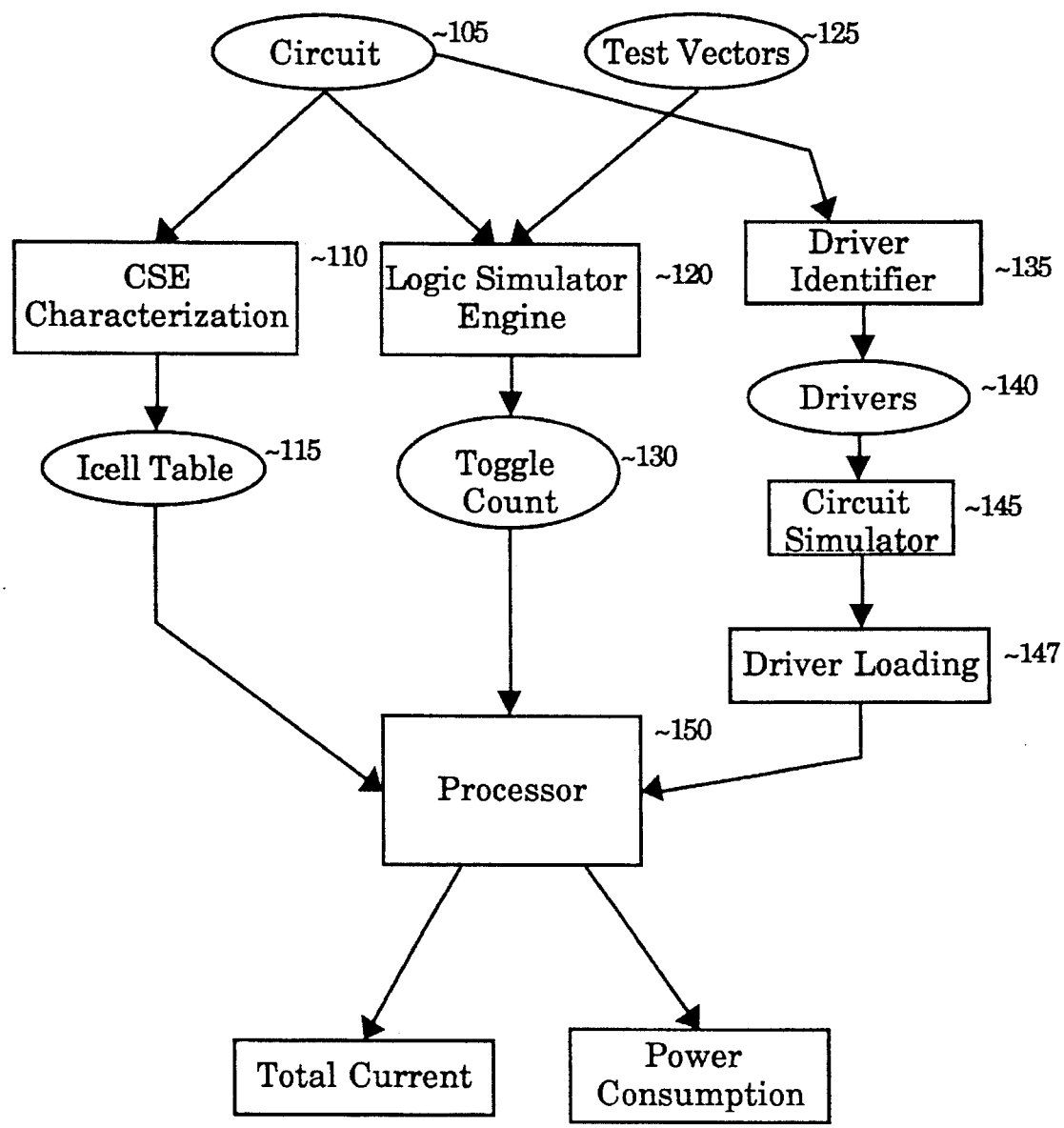
FIG. 2 is a block diagram illustration of one embodiment of the system of the present invention.

A simplified block diagram of system of the present invention is illustrated in FIG. 2. The circuit to be analyzed 105 is provided as input to the characterizer 110 which generates as its output the characterization ($I_{cell}$) table 115. Preferably, the characterizer that is used is found in a circuit simulation tool, such as HSPICE, provided by Cadence, Inc. The logic simulator engine 120 operates a model of the circuit 105 using test vectors as input to determine the toggle count 130. Preferably, the engine is a simulator engine such as the XP series of accelerators, manufactured by Zycad Corporation and running the XPLUS™ logic software tools provided by System Sciences, Inc.

The driver identifier 135, determines from the net list of the circuit 105, the driver device or devices 140 which drive each node. Using the driver device(s) identified for each node, a circuit simulator 145, for example, HSPICE, is operated to determine the capacitive loading contribution at each node by each driver 147. The $I_{cell}$ table 115, toggle count 130 and device driver loading for each node 140 are input to a device such as a processor 150 which performs the computations necessary to determine the total current and power consumption for the circuit 105.

Figure 3:
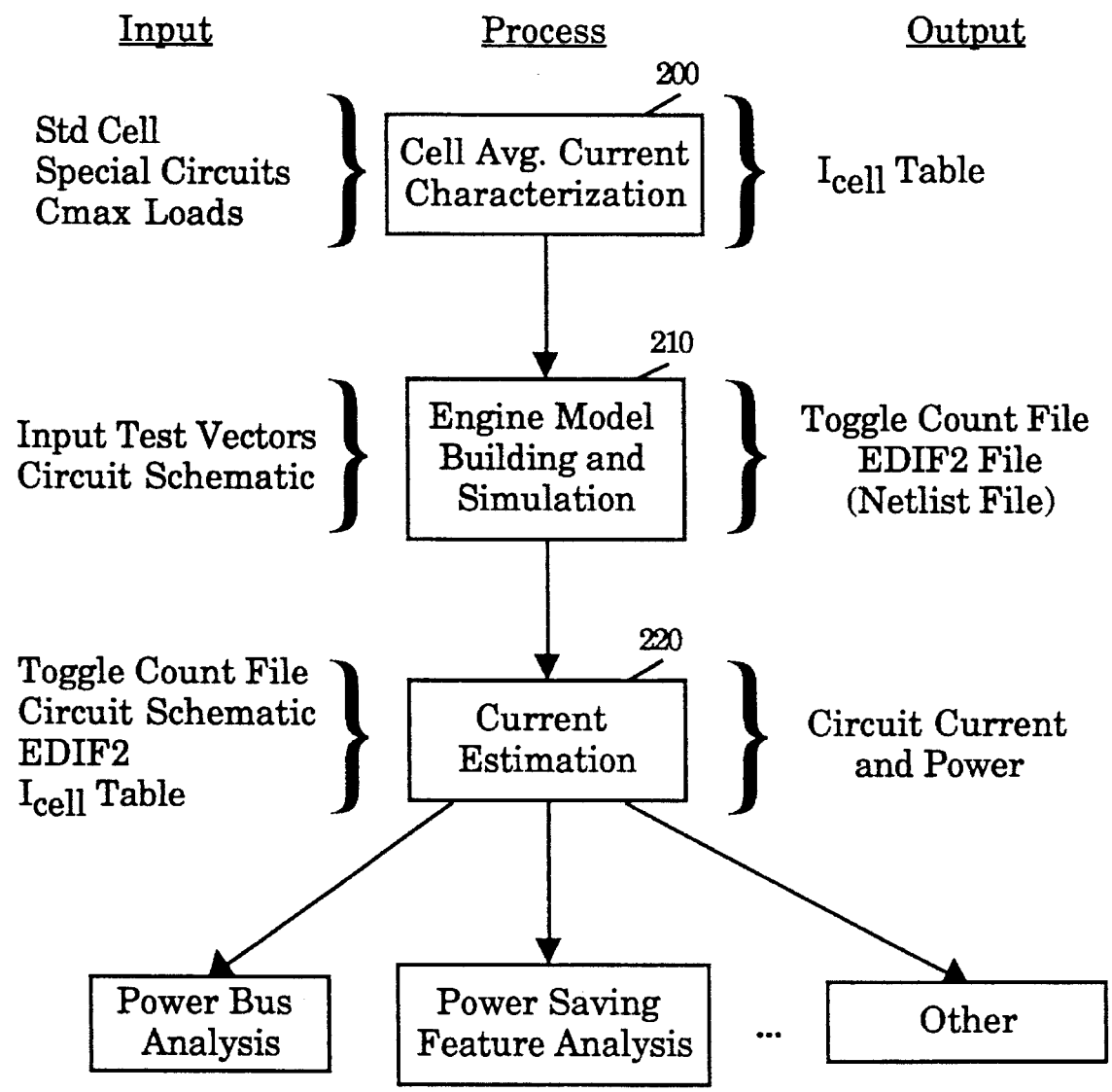
FIG. 3 is a flow diagram illustrating one embodiment of the present invention.

FIG. 3 is a block diagram, which illustrates the process steps and the input and output data used to determine the current for the circuit from which such things as power bus analysis, power saving features analysis and other circuit analysis, can be performed. In particular, the characterization process 200, receives as input cell definitions and capacitive loads for which average current values of the characterization table are determined. The cell definitions include standard circuit cells (Std Cell) as well as special circuit cells (Special Circuits) defined by the user. The maximum capacitive load for a device (Cmax) as well as the capacitive load values to utilize (Cload) are also input. The output of the process is the characterization table ($I_{cell}$ table) which identifies average current values for each cell at different capacitance loads.

The engine model building and simulation process 210 receives as input the files which define the circuit schematic and input test vectors. A net list file is derived from the circuit schematic, such as a net list file in EDIF2 format. Using logic simulation of the circuit and test vectors, a simulation of the circuit is operated and a toggle count for each node is generated.

During the current estimation process 220, the drivers for each node are identified from the net list file and the capacitive loading at the nodes due to the identified drivers is determined from the circuit schematic input. The toggle count and characterization table are also input to generate the current and power information for the circuit.

Figure 4A:
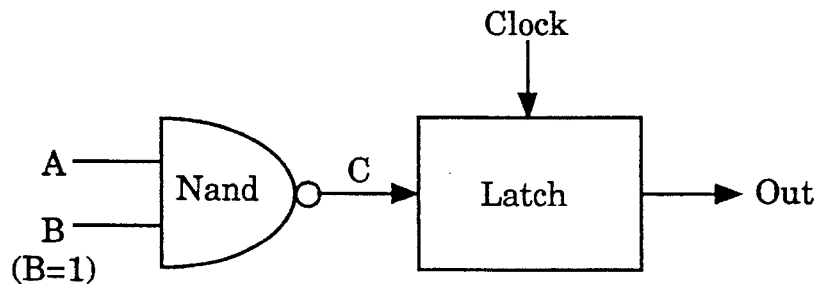
FIG. 4a is a simplified circuit used as an example for illustrating the method and system of the present invention.
Figure 4B:
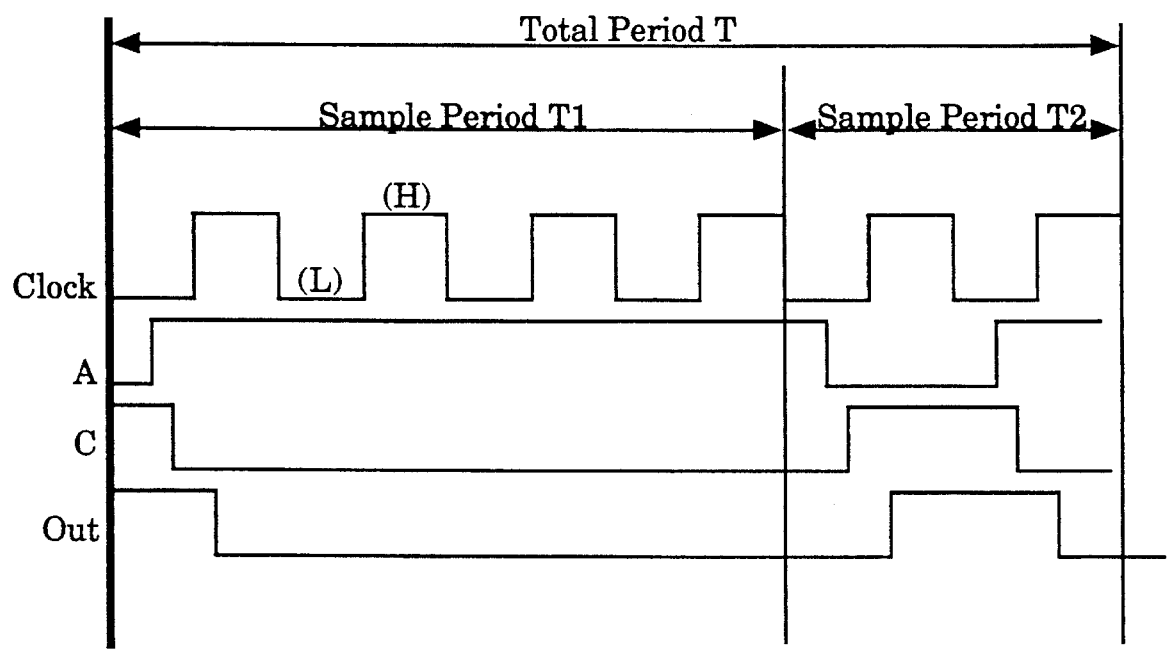

The advantages of the system and method of the present invention can be realized by reference to the simplified example of FIG. 4a, which includes inputs A and B and an output C in which A and B are input to the NAND gate, and C is the output of the NAND gate which is input to a Latch triggered by clock input signal. FIG. 4b illustrates a sample input on nodes A and B, and the operation of the circuit of FIG. 4a. FIG. 4c is a table which illustrates the activity factor calculated for the Latch output ("OUT") and the NAND gate ("C"). Using prior techniques, the NAND gate is estimated to have an activity factor of 0.5 and the Latch is estimated to have an activity factor of 0.25. Using the techniques described herein, the activity factor from the gate is determined to be 0.25 as only one toggle occurred during the 4-clock cycles of the sample period. Similarly, the Latch is determined to have an activity factor of 0.25. FIG. 4d shows the activity factors calculated for the second sample period shown in FIG. 4b. In this situation using prior techniques, the output of the gate activity factor is again generally estimated to be 0.5 and the output of the Latch is estimated to have an activity factor of 0.25. In this sample period, two toggles occurred during 2-clock cycles. Therefore, the actual activity factor using the techniques described herein for both the node of the output of the gate and the output of Latch is 1.0, a significant difference from the activity factors of 0.5 and 0.25 estimated using prior methods. Thus, it can be seen that simple estimation does not work consistently and overestimation and underestimation of current can easily result.

Realistic input or test vectors suites play an important role in the accuracy of the results. Preferably, the vectors should be representative of the type of processes of the application program that the circuit is to be used with. To calculate the average current of the model of the circuit, the vector should be close in function to the user application to be utilized with the circuit. In other cases such as for testing power saving features, for performing electromigration design, etc., the need may be different. The number of NOPs, the number of loops and the way they are modeled are also factors which need attention. The number of NOPs, the number of loops and the way they are modeled, are preferences of the writer of the vectors utilized. A statistical study of operations performed can eliminate the bias or preference of a single writer and provide a fair vector input. It is preferred that an accurate vector come from statistical studies of the real applications. The vectors can be developed or converted from several bench mark programs, or else an interface to run the user applications directly on the model can be used. Preferably, the vector should not be too large to effect the verification time and not too small to effect the sample size. FIG. 5 shows exemplary vectors that were developed based on the X86 instruction mix analysis of assembly instructions frequently used in typical applications round out the X86 line of microprocessors manufactured by Intel Corporation, Santa Clara, Calif. This instruction mix was determined to have the same percentage of instruction mix as the application program typically used with the circuit to be tested.

Figures 6A, 6B:
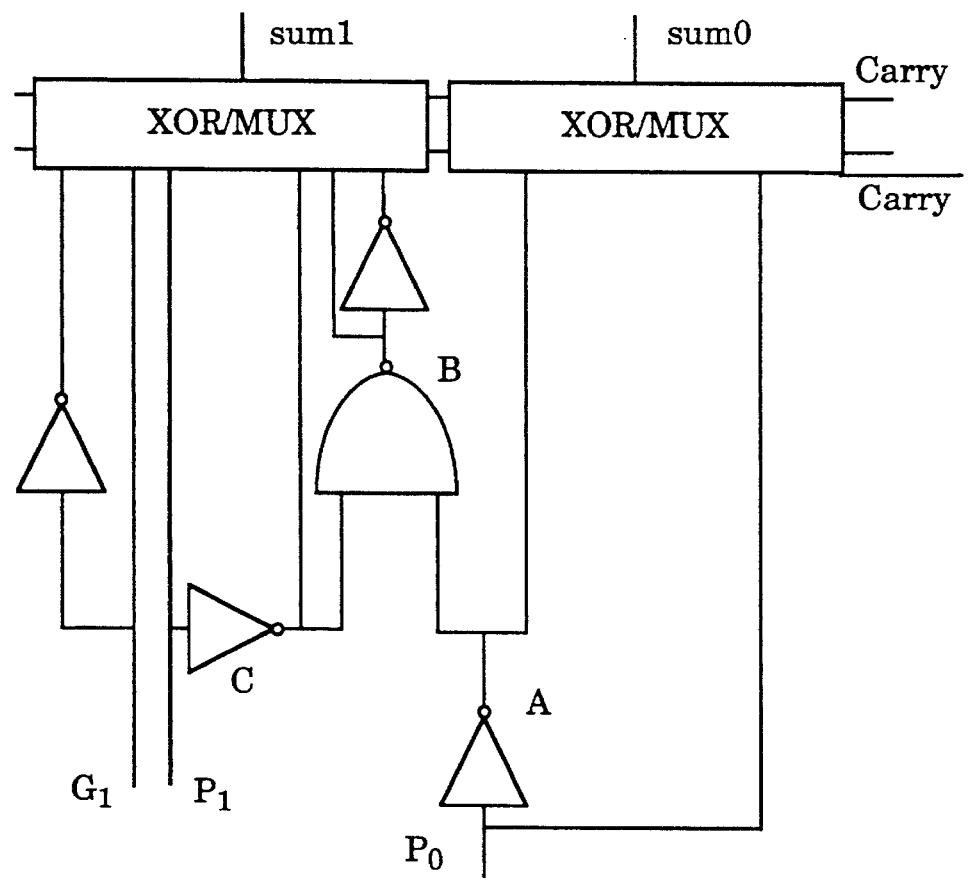
FIGS. 6a and 6b are an adder circuit tested using the method and apparatus of the present invention.

FIG. 6a is a simplified portion of a processor, specifically, the adder circuit from the segmentation unit of the i486 core. In the present example, the simulation conditions for the characterization to be used were 3.6 V operating voltage, 33 Mhz frequency, RF process, 120° C., 1.5 ns input transition and 2 transitions (high and low) per device. The inverter A drives a load of 0.0894 pF. Based on values from the table, the inverter A consumes 12 μA for every toggle. Running vector diag4, the toggle count of inverter A is found to be 4,217. The clock count of the vector is 10,638 producing an activity factor of 4217/10638=0.39. Thus, the average current drawn by inverter A is 0.39*12=4.68 μA. As a comparison, using the prior method of assigning activity factors, the activity factors assigned to the inverter A would be 0.5 and the average current drawn by the device would be ½*12=6 µA.

FIG. 6b shows a data comparison of current consumed by devices A, B and C determined by the new method and a prior art method. By referencing to FIG. 6b, it can be seen that the new method can generate significantly different results compared to a prior art method, particularly for device C. In subsequent tests on the segmentation unit of the i486 core using the vectors shown in FIG. 5, the total average current estimated is 52.25 µA. Using prior techniques, the estimated current is 180 µA. This is 3.5 times over that of current estimated using the method of the present invention.

Figure 7:
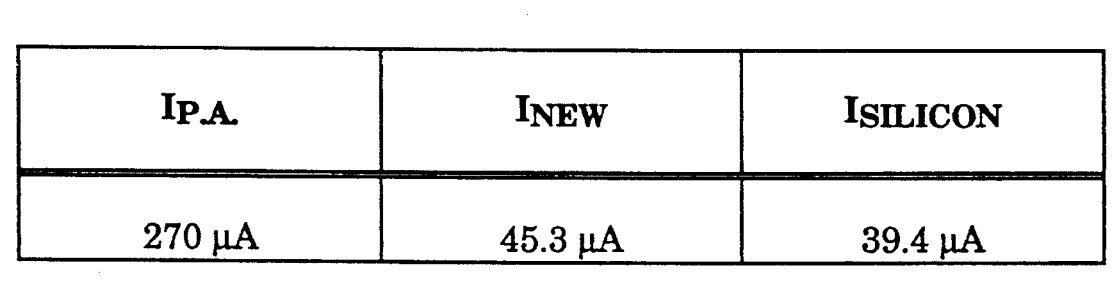

The current consumed by the floating point unit of the i486 core as estimated by the method of the present invention was compared against the results determined by testing silicon. This was performed by running the same vectors utilized during physical testing of the device. The silicon current was determined by calculating the difference in current with the floating point unit enabled and disabled. After scaling for the differences in simulation conditions (i.e., temperature, process skew, etc.), between the tester and the configuration table, the results, shown in FIG. 7, were determined. The results determined using the method of the present invention, came within 15% of the silicon results. The results determined using prior techniques show an overestimation by a factor of at lest 6.8 times the silicon current determined.

Although the invention has been described in conjunction with the preferred embodiment, it is evident that numerous alternatives, modifications, variations and uses will be apparent to those skilled in the art in light of the foregoing description.

What is claimed is:

1. A method for determining current through cells of a circuit comprising at least one cell, each cell comprising at least one device, said method comprising the processor implemented steps of:

generating an average current value for each cell;

generating a toggle count for each cell during a predetermined sample time period, said toggle count indicative of a number of signal transitions during the sample time period;

determining an activity factor for each cell to be equal to the toggle count divided by the number of clock cycles during the sample time period;

computing the current through a cell to be equal to the average current value for the cell multiplied by the activity factor.

2. The method as set forth in claim 1, further comprising the processor implemented step of determining the total current through the circuit by summing the computed currents through each cell.

3. The method as set forth in claim 1, wherein said step of generating an average current value for each cell comprises the processor implemented steps of:

generating a characterization table of average current values for each cell for different values of capacitive loads; and accessing the table for the average current value for each cell.

4. The method as set forth in claim 3, wherein said step of generating a table of average current values comprises the steps of:

executing a simulation of the circuit on said processor for different values of capacitive loads;

measuring the current through each cell of the circuit for different values of capacitive loads.

5. The method as set forth in claim 1, wherein the average current of a cell comprises the switching current and current for charging and discharging capacitances of a load on the cell.

6. The method as set forth in claim 3, wherein the average current of a cell comprises the switching current and current for charging and discharging capacitances of a capacitive load driven by the cell.

7. The method as set forth in claim 3, wherein the processor implemented step of generating a table of average current values generates average current values for a cell at different capacitive load values.

8. The method as set forth in claim 3, wherein the processor implemented step of generating a table of average current values generates average current values for different sizes of a cell.

9. The method as set forth in claim 1, wherein the step of generating a toggle count for each cell comprises the processor-implemented steps of:

generating a model of the circuit comprising cells;

performing a logic simulation on said processor of the operation of the circuit using the model and at least one test vector, said test vector being chosen to be similar in function to said application to be used with the circuit;

monitoring the activity of transitions at the inputs to the cells in the model of the circuit; and incrementing the toggle count for a particular cell each time the state of the input to the cell changes.

10. The method as set forth in claim 9, wherein the steps of monitoring the activity of transitions and incrementing toggle counts comprises the processor implemented steps of monitoring the activity of transitions at nodes of the circuit and incrementing the toggle count for a particular node each time the state of the node changes, said method further comprising the processor implemented step of determining the cell which drives each node.

11. The method as set forth in claim 10, wherein multiple cells drive a node, said step of generating the average current comprises the processor implemented step of averaging the average currents of the cells which drive the node.

12. The method as set forth in claim 11, wherein multiple cells drive a node, said step of generating the average current comprises the processor implemented step of generating the greatest average current of the average currents of the cells which drive the node.

13. The method as set forth in claim 1, wherein a cell comprises multiple devices and the processor implemented step of generating the average current for the cell comprises summing the average current values for each device.

14. The method as set forth in claim 1 further comprising the processor implemented step of determining the power consumption of a cell to be equal to the product of the current through the cell and the load capacitance.

15. A method for determining current through cells of a circuit comprising at least one cell, each cell comprising at least one device, said method comprising the processor implemented steps of:

inputting a representation of the circuit which can be used in a circuit simulator and a logic simulator, said circuit simulator and said logic simulator operating on said processor;

generating an average current value for each cell using the representation of the circuit and the circuit simulator;

generating a toggle count for each cell during a predetermined sample time period using the representation of the circuit and the logic simulators, said toggle count indicative of a number of signal transitions during the sample period;

determining an activity factor for each cell to be equal to the toggle count divided by the number of clock cycles during the sample time period; and computing the current through a cell to be equal to the average current value for the cell multiplied by the activity factor.

16. A system for determining the current consumption of cells in a circuit comprising:

a circuit simulator for simulating the cells of the circuit to determine average current values for each cell of the circuit for driving different values of capacitive loads, said circuit simulator running on said processor;

a logic simulator which executes a logic model of the circuit in response to input vectors and comprises a means for determining a toggle count for each node of the circuit during a sample period comprising a number of clock cycles, said input vectors being comparable to an application used with the circuit, said logic simulator running on said processor;

a cell identifier for identifying for each node, at least one cell which drives each node of the circuit;

a processor coupled to receive the toggle count for each node, the number of clock cycles in the sample period, the average current values for each cell of the circuit and the identification of at least one cell which drives each node of the circuit, said processor determining the activity factor for each node to be equal to the toggle count divided by the number of clock cycles in the sample period and determining the current consumption to be equal to the product of the activity factor and the average current value for a cell.

17. The system as set forth in claim 16, wherein said circuit simulator further generates a table of average current values of cells, said table comprising entries of current values for cells of the circuit at a plurality of load capacitances;

said circuit simulator further determining the load capacitance at each node based upon the drivers identified; and said processor further determining the average current value from the table according to the identification of the cell which drives the node and the capacitance of the load at the node.

18. The system as set forth in claim 17, wherein the processor further computes the power consumption from the current consumption and load capacitance at the node.

19. A processor-implemented system for determining the current consumption of cells in a circuit comprising:

means for simulating the circuit comprising cells to determine average current values through each cell of the circuit for driving different values of capacitive loads;

means for performing a logic simulation of the execution of the circuit in response to input test vectors, said logic simulation running on said processor;

means for generating a toggle count at each node of the circuit during a sample period comprising a number of clock cycles;

means for identifying at least one cell which drives each node of the circuit;

means coupled to receive the toggle count for each node, the number of clock cycles in the sample period, the average current values for each cell of the circuit and the identification of at least one cell which drives each node of the circuit, said means comprising;

means for determining the activity factor for each node to be equal to the toggle count divided by the number of clock cycles which compose the sample period; and means for determining the current consumption to be equal to the product of the activity factor and the average current value for a cell.

20. The system as set forth in claim 19, wherein said means for simulating further comprises means for generating a table of average current values of identified cells at a plurality of load capacitances.

21. The system as set forth in claim 20, wherein said means for identifying at least one cell which drives each node of the circuit identifies the cell from a net list which identifies connections between cells of the circuit.

22. The system as set forth in claim 21, further comprising means for determining the capacitive load of a cell which drives each node of the circuit.

23. The system as set forth in claim 22, said means for determining the current consumption determining the average current value for a cell from the table of average current values based upon the identification of the cell and the capacitive load of the cell which drives the node.

24. The system as set forth in claim 23, further comprising means for computing the power consumption from the current consumption and capacitive load at the node.

* * * * *

UNITED STATES PATENT AND TRADEMARK OFFICE
CERTIFICATE OF CORRECTION

PATENT NO.    :  5,535,370
DATED         :  July 9, 1996
INVENTOR(S)   :  Raman et al.

It is certified that error appears in the above-identified patent and that said Letters Patent is hereby corrected as shown below:

In column 1, at line 58, delete "dock" and substitute --clock--.

Signed and Sealed this

Third Day of December, 1996

Attest:

BRUCE LEHMAN

*Attesting Officer*     *Commissioner of Patents and Trademarks*